United States Patent [19]
Colussi et al.

[11] Patent Number: 5,618,361
[45] Date of Patent: Apr. 8, 1997

[54] PRESSURE SENSOR AND APPARATUS CONTROLLING AND MAINTAINING AIR-PRESSURE IN VEHICLE TIRES

[75] Inventors: Rafael A. Colussi; Néstor J. Vénica, both of Guadalupe Norte, Argentina

[73] Assignee: Col-Ven S.A., Provincia de Santa Fe, Argentina

[21] Appl. No.: 462,431

[22] Filed: Jun. 5, 1995

Related U.S. Application Data

[60] Division of Ser. No. 47,240, Apr. 14, 1993, Pat. No. 5,465,772, which is a continuation-in-part of Ser. No. 380,620, Jul. 14, 1989, abandoned.

[30] Foreign Application Priority Data

Jul. 14, 1988 [BR] Brazil ................................. 8803606

[51] Int. Cl.⁶ ............................................. B60C 23/00
[52] U.S. Cl. ..................... 152/416; 137/487.5; 340/442; 340/626
[58] Field of Search ................................. 152/415, 416, 152/417; 137/557, 487.5; 340/442, 626

[56] References Cited

U.S. PATENT DOCUMENTS

| | | |
|---|---|---|
| 3,276,503 | 10/1966 | Kilmarx ................................. 152/417 |
| 4,582,107 | 4/1986 | Scully ................................... 152/417 |
| 4,599,902 | 7/1986 | Gray ............................... 250/231.19 X |
| 4,782,879 | 11/1988 | Le Chatelier et al. ................. 152/417 |

FOREIGN PATENT DOCUMENTS

| | | |
|---|---|---|
| 0193452 | 9/1986 | European Pat. Off. . |
| 0263251 | 4/1988 | European Pat. Off. . |
| 2312772 | 12/1976 | France . |
| 2577060 | 8/1986 | France . |
| 2850787 | 6/1980 | Germany . |
| WO-A-8908031 | 9/1989 | WIPO . |

*Primary Examiner*—Michael W. Ball
*Assistant Examiner*—Francis J. Lorin
*Attorney, Agent, or Firm*—Lowe, Price, LeBlanc & Becker

[57] ABSTRACT

A pressure sensor for an apparatus for controlling and maintaining air pressure in vehicle tires. The vehicle compressor outlet is connected through individual pneumatic tire circuits to each vehicle tire, via rotary couplings in the associated axles. Each tire circuit includes tubing for carrying air and monitoring tire pressure, the circuits supporting pressure sensors and electrovalves housed in a control unit in the dashboard of the vehicle. The sensor includes a piston which causes a shutter to move in and out of the light path of a LED/phototransistor device. When the sensor signals low tire pressure via a an electronic circuit, the corresponding electrovalve is energized for the compressor to pump the tire up back to its set pressure. The sensor further includes means for varying the set point.

5 Claims, 4 Drawing Sheets

PRESSURE SENSOR AND APPARATUS CONTROLLING AND MAINTAINING AIR-PRESSURE IN VEHICLE TIRES

This application is a divisional of application Ser. No. 047,240 filed Apr. 14, 1993, now U.S. Pat. No. 5,465,772, which, in turn, is a continuation-in-part of my earlier application Ser. No. 380,620, filed Jul. 14, 1989, now abandoned.

FIELD OF THE INVENTION

The instant invention is directed to a novel air-pressure sensor, in particular one for forming part of an electronic and pneumatic apparatus for controlling and maintaining air pressure in vehicle tires. The apparatus includes a pneumatic circuit for distributing air from an internal pressure source, such as the compressor of a pneumatic braking system of the vehicle, and an electronic circuit interfacing the pneumatic circuit for sensing low tire air-pressure and metering air from the air source to the different tires as needs be.

More particularly, the pressure sensor of the invention is suited for use with the apparatus for controlling and maintaining the air pressure in land vehicle tires disclosed in my above-cited application Ser. No. 047,240.

BACKGROUND OF THE INVENTION

A tire may wear unevenly and its life span shorten if left to roll at low pressure for substantial mileage. Moreover, when air-pressure in the different tires is uneven or inadequate in any way, vehicles are open to accident if braked suddenly at high speed or when transporting heavy loads. The development of new means of transport, both for goods and passengers, and improved road construction have brought trucks and buses of ever increasing size and speeds as well as slicker and faster motor-cars on the roads. It is thus essential for road safety that technologies regarding all the different vehicle parts keep pace by providing means preventing minimum fault which could lead to catastrophic results.

Equipment is already known for regulating air-pressure in tires in both light and heavy vehicles. It generally comes with a control panel mounted to the vehicle dashboard for the driver to keep a check on tire pressure status. The object of this sort of equipment is to enhance vehicle safety and protect tires from damage through inadvertant use at inadequate pressure levels. A necessary feature is a reliable means for sensing the air pressure in each tire under control.

SUMMARY OF THE PRIOR ART

Mechanical air-pressure regulators comprise a diaphragm means driven by a screw-spring mechanism. Although they have proven some worth in protecting tires and making vehicles safer, their intrinsic mechanical nature causes them to be insensitive to small pressure variations, rendering them imprecise for keeping the initial pressure the same. They are also unable to restore the exact set (or initial) pressure to a leaked tire or take some time to do so.

Another apparatus comes with an automatic electromechanical regulators of the type designed originally for refrigerators, air conditioners and the like, not really adequate constructively for tire pressure regulators. The variety and relative complexity of the parts that make it up make it difficult to assemble and prone to continuous maintenance because of early wear of some parts, particularly the air distribution rotor damaging electrical connections and tube joints. In fact, it does not seem to have attaines the purpose for which it was developed, that is, in extending tire-life.

U.S. Pat. No. 4,599,902 to Gray discloses a tire-pressure detection apparatus comprising a moveable or deformable pressure-responsive control element for engagement to a tire inlet/outlet. This control element, preferably in the form of a Bourdon-tube pressure-gauge, has a vane attached to it which switches in and out of a LED/phototransistor coupler which drives an output transistor to connect a pulse generator to suitable alarm or control means responsive to a low-pressure indicative signal to pump the tire up This device is by its very nature sensitive to mechanical vibrations and jerks, rendering it unsuitable for vehicles subjected to severe travelling conditions, such as encountered when transporting heavy, loads on rough and earth roads or in bad weather conditions.

A need is therefore felt for robust yet simple means for detecting air pressure in vehicle tires.

SUMMARY OF THE INVENTION

An object of the invention is a unit for sensing air pressure in vehicle tires and generating an electrical signal for controlling an apparatus for maintaining the right amount of air in the tires.

It is also an object of the invention to provide a robust and reliable, yet simple to manufacture and service, pressure sensor.

It is another object of the invention to provide a sensor for an apparatus very sensitive to pressure and small pressure variations, wherein tire leakages may be compensated with hardly any time lag, and wherein pressures may be selected from a large range.

Yet another object of the invention is a pressure sensor which may be installed together with similar sensors inside a dashboard mountable structure which may be installed quickly and efficiently for reliable operation, particularly under heavy travelling conditions The above-stated and other objects and advantages are achieved by a pressure sensing unit which comprises a generally cylindrical housing having a longitudinal bore including a seat therein; an orifice for receiving air at a pressure to be sensed into the bore and a cross-bore traversing the bore and longitudinally spaced from the orifice. Between the orifice and the cross-bore there are: piston means contained in the bore and generally resting on the seat, plunger means supporting shutter means projecting away from the piston means, a diaphragm sealing the bore and separating the piston means from the shutter means, a light-emitting diode (LED) and a phototransistor on opposite sides of each other across the bore so as to define a light passage therebetween, and a spring urging the shutter supporting plunger away from the light passage to enable light from the LED to impinge on the phototransistor unless there is sufficient pressure at the orifice acting on the piston to push the plunger so that the shutter crosses into the cross-bore to block the light passage.

The above sensor unit may advantageously further include means for varying the set pressure point below which the phototransistor outputs an active electrical signal, including a thread on an end of the housing adjacent the orifice, an adjustable cap screwed on to the thread and a stem connected to the cap and the piston means by a second spring, whereby the position of the cap on the thread may be adjusted to calibrate the set point.

DETAILED DESCRIPTION OF AN EMBODIMENT OF THE INVENTION

Figure 1B:
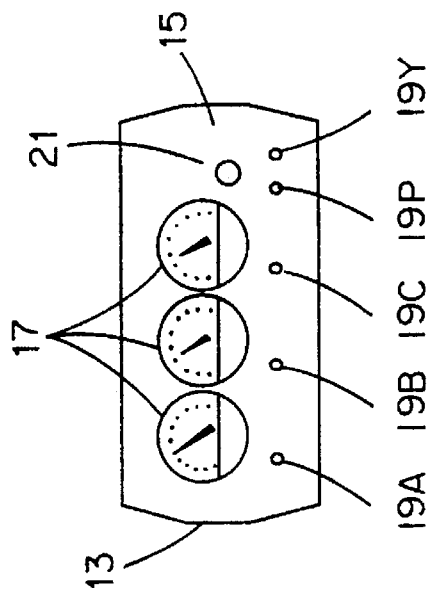
FIG. 1 illustrates the dashboard-mounted control unit comprising the sensor devices of the invention and is divided into FIGS. 1A and 1B showing the front and back panels respectively of the unit.
Figure 1A:
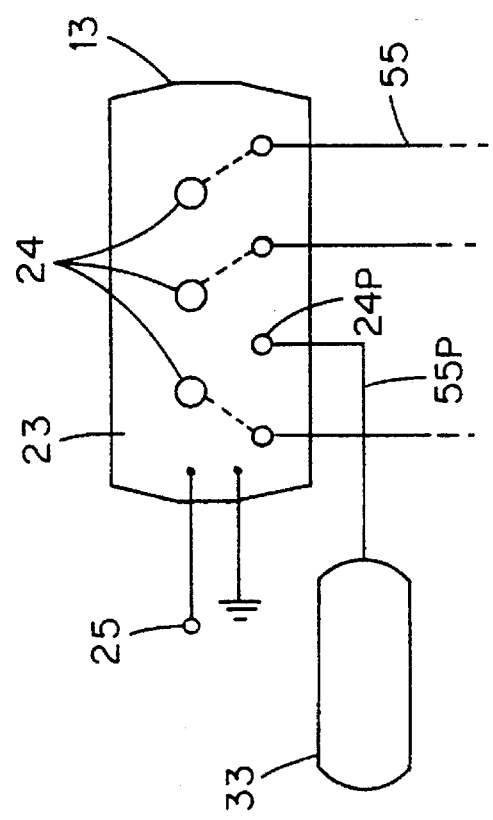

Refering to FIG. 1, the tire-pressure control apparatus comprises an electronic control unit 11 (FIG. 2) housed in a closed box 13 including a front panel 15 mounted to a truck's dashboard (not shown) in front of the driver. The front panel portrays sundry pressure gauges 17 and LED indicators 19, and a push-button 21.

The push-button switch 21 enables the driver to activate or deactivate the apparatus. In the deactivated state, tire pressure is not monitored, one of the LEDs 19P lighting up to warn the driver of this unprotected mode. LED 19P is preferably red and also lights up if the compressor outlet pressure is lower than nominal.

The control box 13 also has a rear (i.e. facing away from the driver towards the vehicle's hood) panel 23 holding a plurality of air-tube terminals 24 which are connected to the pneumatic circuit of the apparatus.

Figure 2:
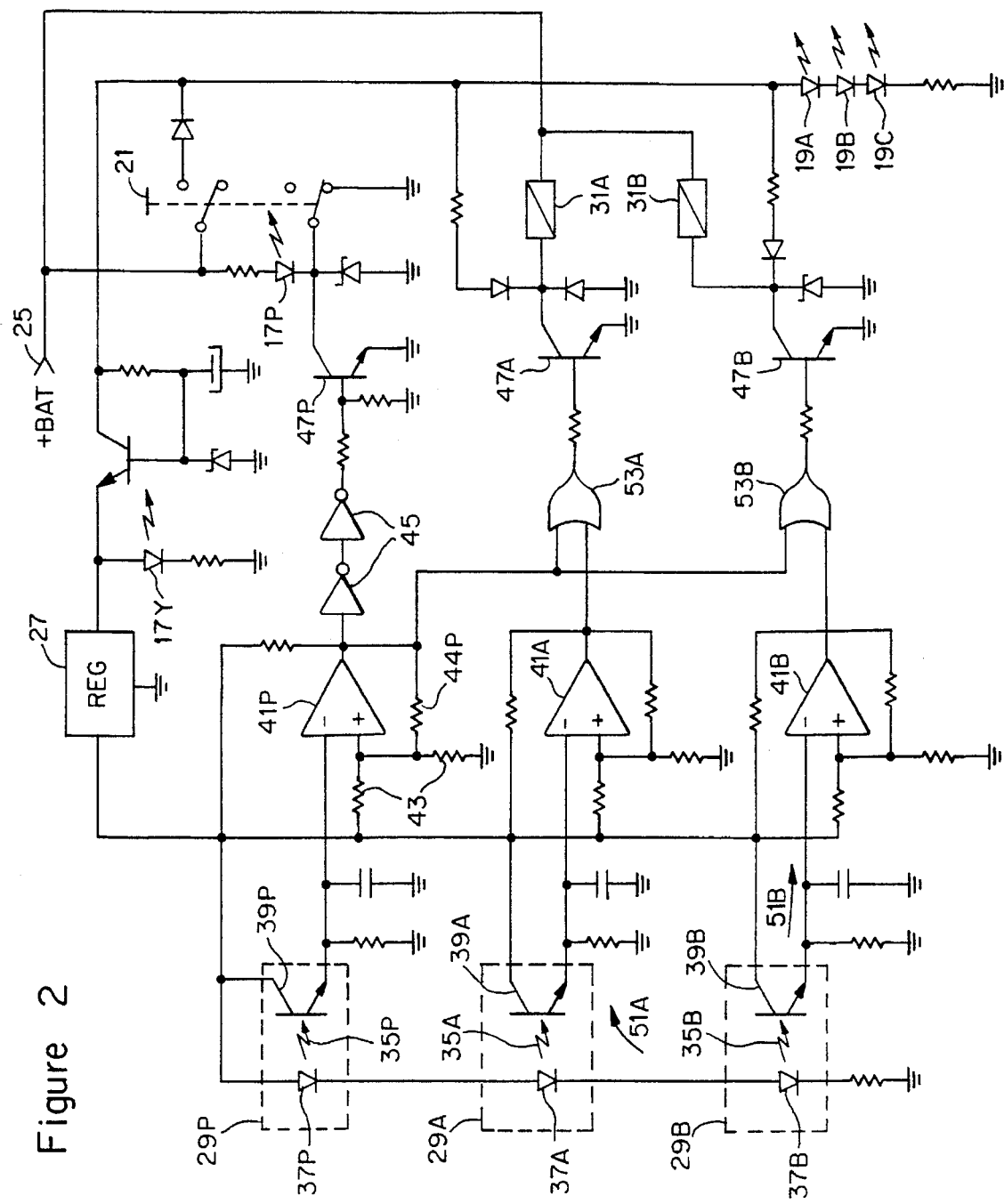
FIG. 2 is a schematic of an electronic circuit contained in the unit of FIG. 1 and which interface sensors of the invention.

The control unit 11 comprises an electronic circuit shown schematically in FIG. 2. Power is supplied by the vehicle's battery (not shown) via a battery terminal 25 and the push-button switch to a voltage regulator 27. The red LED 17P is in parallel with the switch and thus permanently connected to the battery terminal 25. In the deactivated mode, the switch 21 connects the red LED 17P to ground voltage so that it lights up.

Figure 3:
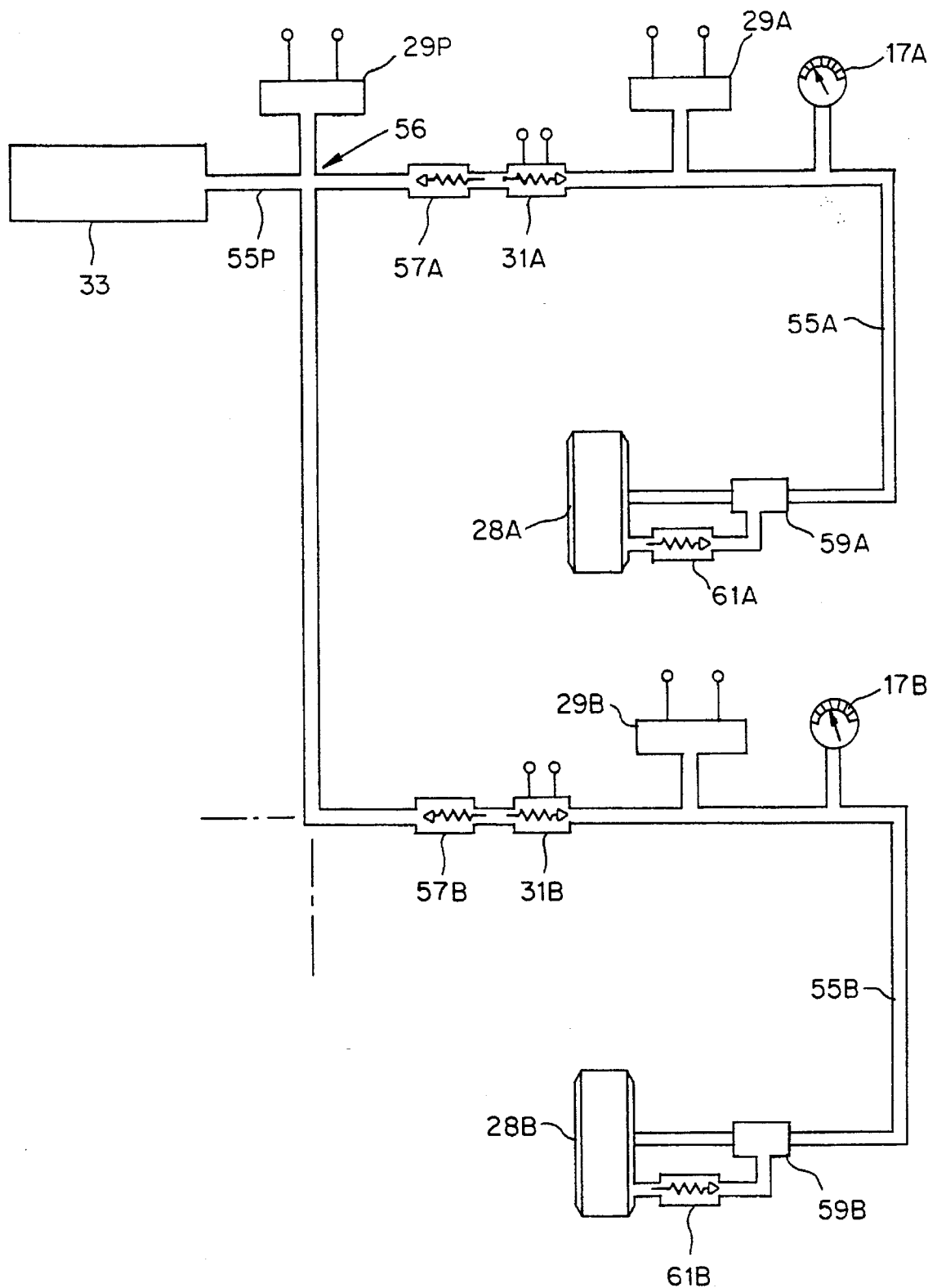
FIG. 3 is a schematic of the pneumatic circuit coupled to the unit of FIG. 1 for interfacing with the circuit of FIG. 2; the pneumatic circuit including a plurality of pressure sensors of the present invention.

Pressing the button 21 activates the apparatus, whereby LED 17P is turned off and electric current from terminal 25 is supplied to a voltage regulator circuit 27, to a green LED 17Y on the panel 15 and to LEDs 17A, 17B . . . lighting up a plurality of pressure gauges 19, one for each tire 28 (FIG. 3). The electronic circuit 11 of FIG. 2 interfaces with the pneumatic circuit 30 of FIG. 3 by means of pressure sensors 29 and electrovalves 31. As disclosed in more detail hereinafter, the pressure sensors 29 comprise units having a construction according to the present invention and which operate to continuously monitor air-pressure in one or more associated tires 28.

FIG. 3 shows the pneumatic circuit 30 which is airpressurized by the compressor 33 to maintain and sustain, when required, the tires 28 of a vehicle properly pumped up. Only two such tires 28A, 28B are shown for the sake of simplicity to illustrate the basic circuit and the add-ons for each tire 28. The compressor outlet is connected by tubing 55P to the compressor pressure sensor 29P and a hub 56 for distribution, via tubing 55A and 55B, to the tires 28A, 28B.

Each tire circuit 55A, 55B includes a check valve 57, the electrovalve 31, the pressure sensor 29 and the pressure gauge 17, before joining a rotor or rotary coupling 59. (Suffixes A, B, etc. are omitted from the reference numerals when generalizing. ) The wheel includes a second checkvalve 61 connecting the tire 28 to the rotary coupling 59. Both check valves 57, 61 protect the tire system from leaking should any part of the tubing 55 become damaged or the compressor be disconnected (e.g. for servicing)

Operation is as follows. The pressure sensors 29 are calibrated to a threshold value corresponding to normal tire pressure, say 95 psi. The compressor outlet pressure is normally much higher of course. In the event tire 28A, for instance, should leak air and lose a certain amount of pressure, say down to about 90 psi, its corresponding sensor 29A immediately generates an electrical signal for the tire monitor circuit 51A (FIG. 2) to open electrovalve 31A, in order to let pressurized air through from the compressor 33 to the tire 28A. Once the tire has recovered the right pressure (95 psi), the pressure sensor 29A signals the monitor circuit to close the valve 31A back again. The driver may monitor all tire pressures visually by means of the gauges 19 in the dashboard panel 15.

Figure 4:
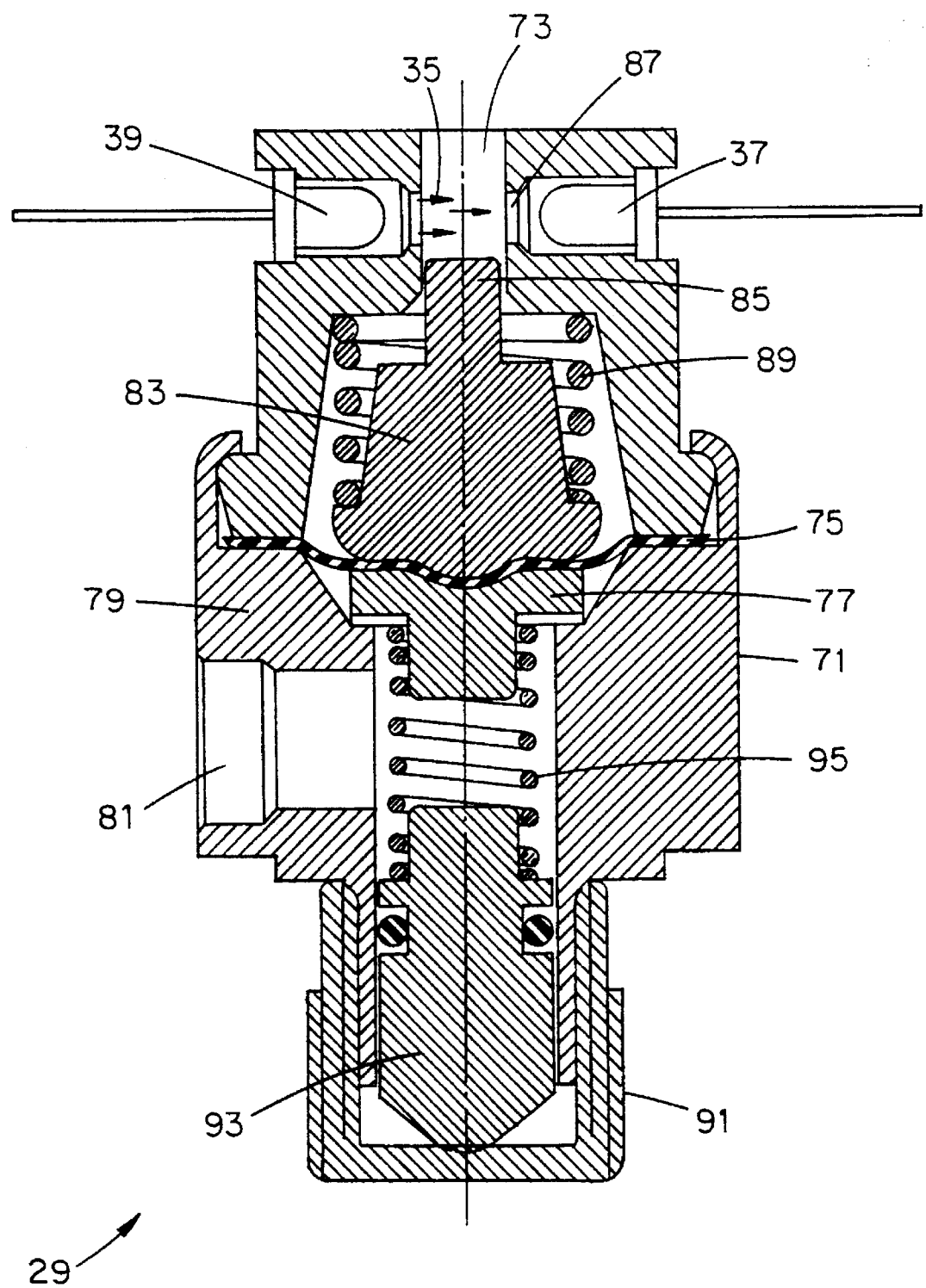
FIG. 4 is a longitudinal cross-section of a pressure sensor according to the present invention and which advantageously interfaces with the circuits of FIGS. 2 and 3.

FIG. 4 depicts, in longitudinal section, a preferred embodiment of a pressure sensor 29 according to the present invention. It comprises a generally cylindrical housing 71 having a longitudinal bore 73. The bore 73 contains a diaphragm 75 and a piston element 77 generally resting on a seat 79. An orifice 81 on one side of the housing connects the bore to the tubing 55 (FIG. 3). On the side of the diaphragm 75 opposite the piston 77 there is a plunger 83 supporting a shutter 85 projecting away from the diaphragm 75. At this end of the housing there is a cross-bore 87 for mounting a LED 37 and a phototransistor 39 on opposite sides of the central bore 73, so as to define a light passage 35 therebetween. A spring 89 urges the shutter supporting plunger 83 away from the light passage 35, such that light from the LED 37 may impinge on the phototransistor 39.

If there is sufficient pressure at the side orifice 81 from the associated tire 28, the piston pushes the plunger 83 so that the shutter 85 crosses into the cross-bore 87 blocking the light passage 35. This enables the phototransistor 39 to signal normal air pressure in the tire 28.

The other end of the housing 71 is threaded externally to accomodate an adjustable cap 91. The cap 91 is in contact with a static stem 93 connected to the piston 77 by a spring 95 and may be adjusted by hand, a screwdriver or the like to calibrate the set pressure point.

One such pressure sensor 29P responds to inlet pressure supplied by the compressor 33. Refering back again to FIG. 2, inlet pressure being normal, that is, over a predetermined threshold, a light passage 35P between a LED 37P and an associated phototransistor 39P is blocked. A pull-up resistor thereby forces the negative (or inverting) input (−) of an operational amplifier (op-amp) 41P up and over the voltage at the positive (or non-inverting) input (+) which is set by a voltage-divider resistor network 43. The output of the opamp 41 is connected by a feedback resistor 44P to enhance hysteresis in the switching response of the op-amp 41P. The low level normally present at the output of the op-amp 41P is twice inverted by a pair of cascaded logic inverter gates 45 and shuts off a driver transistor 47P. The op-amp 41P and its associated circuitry condition the signal derived from the pressure sensor, in particular to sharpen driver transistor 47P switching and introduce hysteresis to avoid oscillations when pressure is near threshold levels or from mechanical vibrations, which could be encountered if the vehicle travels over rough terrain.

This driver transistor 47P connects the cathode of warning LED 17P to ground, in parallel with the push-button switch 21. If the compressor 33 pressure is too low, the light passage 35P will become unblocked, resulting in that the driver transistor 47P turns on and, consequently, so does the LED 17P.

The electronic circuit in FIG. 2 comprises a plurality of tire monitor circuits 51. Again, only two such tire monitor circuits 51A and 51B are shown for simplicity. For example, the circuits 51A, 51B may correspond to the tires 28A, 28B (FIG. 3) of a two-wheel axle of the vehicle.

If tire pressures are at the right level, the corresponding pressure sensors 29A, 29B will block the light passages 35A, 35B formed between respective pairs of LED 37A, 37B and phototransistor 39A, 39B assemblies. The phototransistors 39A, 39B are in common-emitter configurations, so that the associated op-amps 41A, 41B will normally supply high levels to respective logic NOR gates 53A, 53B The resulting logic low levels at the ouput of these NOR gates 53 will thus keep driver transistors 47A, 47B in the off state. These driver transistors 47A, 47B form solid state switches in series with the solenoids of a pair of electrovalves 31A, 31B. The electrovalves 31 control high pressure air supply from the compressor 33 to the respective tires 28 through the pneumatic circuit disclosed hereinbefore in connection with FIG. 3.

If pressure at one (or more) of the tires 28, say tire 28A, drops down low, light from the LED 37A will impinge on the phototransistor 39A in the corresponding pressure sensor 29A, driving it to saturation. The op-amp 41A will receive a high voltage at its negative input (−) so that its output will go low, the NOR gate output go high, and driver transistor 47A saturate to energize the solenoid of the corresponding electrovalve 31A. As a result, the valve 31A will open to let pressurized air enter the tire 28A until the tire has been inflated to a predetermined pressure (plus a bit more to allow for hysteresis). The feedback resistors may be dimensioned so that the response function has hysteresis in the 90–100 psi range.

The NOR gates 53 have a second input each jointly connected to the output from the op-amp 41P in the compressor monitor circuit, to ensure that the tire electrovalves 31 are kept closed in the event that the compressor 33 should become under pressurized. This will protect the tire 28 from becoming even more unpumped under such circumstances and will also ensure that compressor pressure is not permanently lost in the event of a big tire leak, such as a blow-out. This is important to preserve vehicle braking ability.

The pressure sensors 29 and electrovalves 31 are all conveniently housed inside the cabin box 13. This minimizes electrical wiring and avoids having electrical leads other than the power supply leading out of the rear panel 23. All tubing 55, including from a trailer hooked on to the back of the lorry, is connected straight from the rotors 59 to the tube terminals 24 on the rear panel 23. This has several advantages, such as simplifying maintenance and shielding devices 29 and 31 from bangs and dirt and reducing the chances of an electrical wire being severed or having to be layed out in protective shieths. Thus the tube terminals 24 comprise an inlet terminal 24P from the compressor 33 plus terminals 24A, 24B, . . . for the tubing 55 to the tires 28.

Although a preferred embodiment has been brought out in relation to the drawings, the invention is by no means limited thereto but rather extends to all embodiments within the purview of the appended claims.

We claim:

1. A pressure sensing unit comprising:

a housing having a longitudinal bore, said bore including a seat therein;

an orifice for receiving air at a pressure to be sensed into said bore, and a cross-bore traversing said bore and longitudinally spaced from said orifice;

piston means contained in said longitudinal bore between said orifice and said cross-bore, said piston means generally resting on said seat;

plunger means in said longitudinal bore and supporting shutter means projecting away from said piston means and towards said cross-bore;

a diaphragm sealing said bore between said orifice and said cross-bore, said diaphragm separating said piston means and said shutter means;

a light-emitting diode and a phototransistor housed in said cross-bore on opposite sides of each other across the longitudinal bore so as to define a light passage therebetween; and elastic means urging said plunger means away from the light passage to enable light from the light-emitting diode to impinge on the phototransistor unless there is sufficient pressure at said orifice acting on said piston means to push the plunger means so that the shutter means crosses into the cross-bore to block the light passage.

2. The pressure sensing unit of claim 1, wherein said elastic means comprises a first spring urging said plunger towards said diaphragm.

3. The pressure sensing unit of claim 1, further including:

a thread on an end of the housing adjacent said orifice:

an adjustable cap screwed on to said thread;

a stem connected to said cap and said piston means by second spring means, whereby the position of said cap on said thread may be adjusted to calibrate the set pressure point.

4. In a vehicle having a compressor for outputting air at a nominal pressure and a plurality of axles with at least a pair of wheels mounted on each and normally pumped up with air to at least a set pressure less than said compressor nominal pressure, pressure sensor means for controlling and maintaining air pressure in an associated one of said tires and including tubing for monitoring and carrying air to said associated tire, and means for coupling pressurized air from said compressor to said tubing means, said pressure sensor means further comprising:

electrovalve means in the tubing, rotary coupling means mounted to the associated axle for coupling said pressurized air between said tubing and said tire, a pressure sensor unit connected at a point on the associated tubing intermediate said electrovalve means and said tire, said pressure sensor unit arranged to continuously sense the air-pressure in the associated tire and generate a first active electrical signal in response to air pressure in said tire being lower than said set pressure, and electronic circuit means including operational amplifier means having an input for receiving said first active signal from the associated pressure sensor unit and an output for generating a second active electrical signal in response to said first active signal at its input to cause said electrovalve to open when and while said tire air-pressure is substantially lower than said set pressure;

wherein said pressure sensor unit comprises:

a generally cylindrical housing having a longitudinal bore including a seat therein, said bore in separate communication with an orifice for receiving air at a pressure to be sensed into said bore and a cross-bore traversing said longitudinal bore and longitudinally spaced from said orifice;

said cross-bore housing a LED and a phototransistor on opposite sides of each other across the longitudinal bore so as to define a light passage therebetween, said phototransistor connected to said input of the electronic circuit means; and said longitudinal bore housing, between said orifice and said cross-bore:

a piston generally resting on said seat, a plunger supporting a shutter projecting away from said piston, a diaphragm sealing said bore and separating said piston from said shutter, and a spring urging said shutter supporting plunger away from the light passage to enable light from the LED to impinge on the phototransistor unless there is sufficient pressure at said orifice acting on said piston to push the plunger so that the shutter crosses into the cross-bore to intercept the light passage.

5. The pressure sensor means of claim 4, said vehicle including a dashboard and box means for housing said electronic circuit means, said box housing means including a front panel adapted for mounting to said dashboard;

wherein said pressure sensor unit further includes gauge means mounted on said front panel and coupled to said tubing.

* * * * *